United States Patent Office 3,442,621
Patented May 6, 1969

---

3,442,621
PHOSPHORUS PRODUCTION
John A. Hinkebein, Manchester, Mo., assignor to Monsanto Company, St. Louis, Mo., a corporation of Delaware
Filed Oct. 7, 1965, Ser. No. 493,816
Int. Cl. C01b 25/02
U.S. Cl. 23—223      4 Claims

ABSTRACT OF THE DISCLOSURE

The phosphorus content of a phosphorus and water type sludge is reduced by treating the sluge with chromic acid and coalescing the phosphorus in the presence of hydrochloric acid or sulfuric acid.

---

Figure 1:
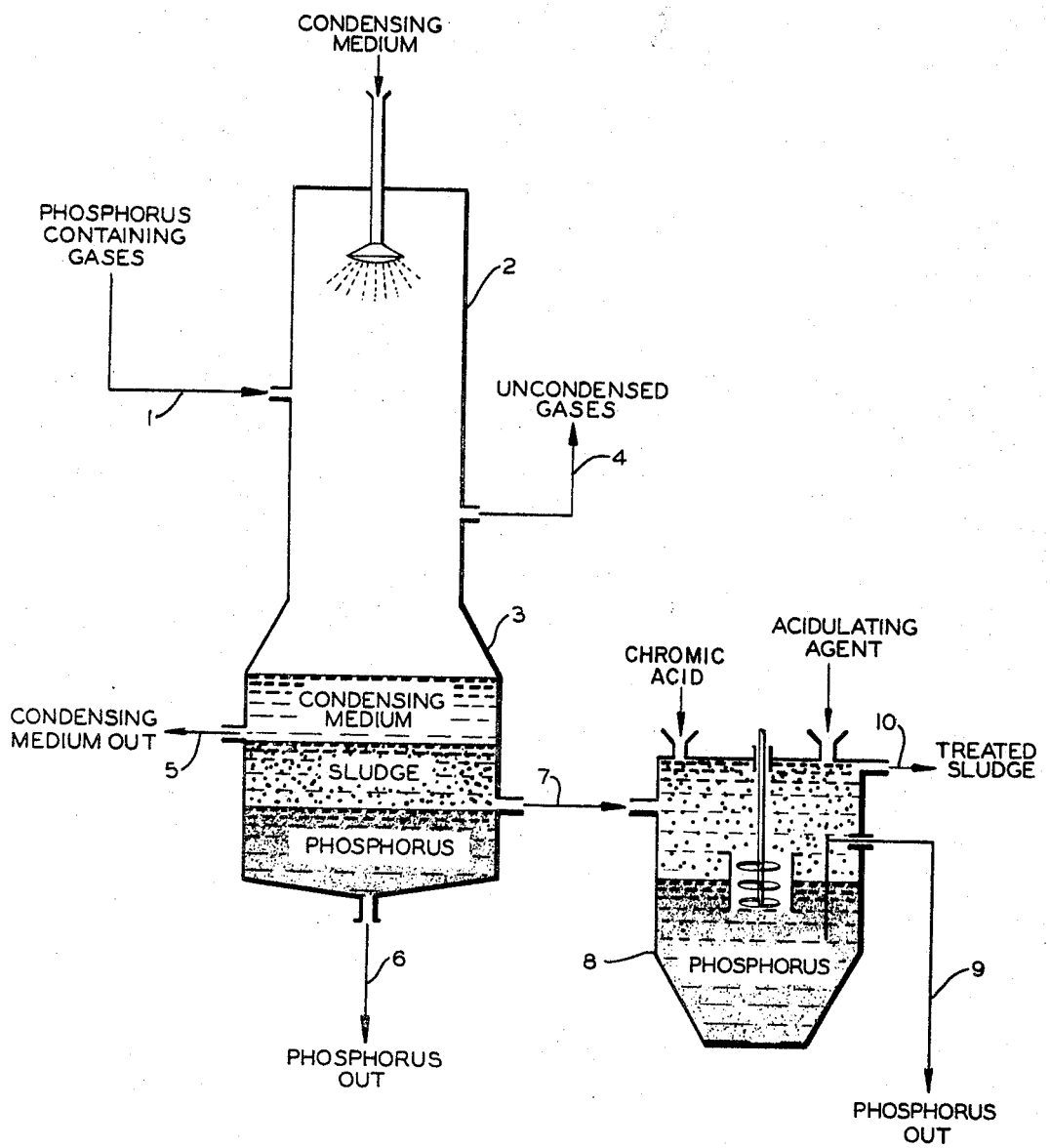

This invention relates to processes for the production and recovery of phosphorus and is directly concerned with decreasing the phosphorus content of sludge obtained as a by-product in phosphorus production and, more particularly, relates to processes for separating phosphorus from a phosphorus-in-water type sludge to recover the phosphorus therefrom.

In the production of elemental phosphorus by the thermal reduction of phosphatic materials with a reducing agent, such as coke or other carbonaceous reducing agents, in the presence of a flux such as silica, the phosphorus-containing gases given off in the furnaces contain solid impurities such as particles of slag and unfused constituents of the charging materials which cause the formation of sludge when the phosphorus vapor is condensed to the liquid form. This sludge contains varying but appreciable amonuts of phosphorus which oftentimes renders problems in the disposal thereof as well as lowering the over-all yield of phosphorus produced.

The sludge, as the term is used in the art and herein, is a somewhat poorly defined emulsion or dispersion containing solid impurities, water and phosphorus in widely varying proportions with usually a density between the density of phosphorus and the density of water. The type of emulsion with which the present invention is concerned is primarily a phosphorus in water type emulsion, that is, the phosphorus being the discontinuous phase and the water being the continuous phase. In general, the discontinuous phase is usually in the form of globular particles having fine particulate impurities associated therewith, with the size of the particles being generally in the range of from millimeter dimensions to micron dimensions.

Heretofore, methods for decreasing the phosphorus content of the sludge have been, in general, physical methods for separating the phosphorus from the sludge with such methods as filtration, distillation, centrifuging, briquetting and the like being employed. However, such methods leave much to be desired because of, among other things, such limitations as the expense of the methods, the type of equipment necessary and the maintenance required thereon, and the quality of the phosphorus recovered. As can be appreciated, therefore, a method which uses a chemical treatment for decreasing the phosphorus content of the sludge and thereby minimizes or obviates the limitations of the foregoing methods would represent an advancement in this art.

It is, therefore, an object of this invention to provide an improved process for the production and recovery of phosphorus.

It is another object of this invention to provide an improved process for decreasing the phosphorus content of sludge obtained as a by-product in phosphorus production.

It is another object of this invention to provide an improved process which uses a chemical treatment for decreasing the phosphorus content of sludge obtained as a by-product in phosphorus production.

It is a still further object of this invention to provide an improved process which uses a chemical treatment for reducing the phosphorus content of the sludge and thereby minimizes or obviates the limitations of the pysical methods used heretofore.

It is a still further object to provide an improved process for the recovery of phosphorus from sludge obtained as a by-product in phosphorus production.

These, as well as other objects of this invention, are accomplished by a process which comprises treating the sludge with chromic acid and coalescing the phosphorus in the sludge in the presence of an acidulating agent in order to decrease the phosphorus content of the sludge, all of which will be more fully described hereinafter. The treatment with the chromic acid can be applied either during the formation of the sludge or after formation and for purposes herein the term "treating the sludge" is intended to cover the treatment thereof either during or after its formation. As can be appreciated, such a process is extremely versatile in that it can be used at various stages within the process for the production of phosphorus. In addition, the process is simple, economical and permits the recovery of a relatively high quality phosphorus. It has been found, quite unexpectedly, that coalescing the phosphorus in the sludge in the presence of an acidulating agent greatly increases the rate of coalescence (separation) of the phosphorus from the sludge over that normally obtained when using chromic acid.

In general, chromic acid can be used or can be formed in situ during the treating of the sludge by acidifying a water-soluble hexapositive chromium-containing compound. By "water-soluble hexapositive chromium-containing compound" is meant any such compound which has a solubility greater than about .05% by weight in water. In particular, such water-soluble hexapositive chromium compounds include the alkali metal chromates and dichromates such as sodium, potassium, lithium chromates and dichromates and the like, the alkaline earth metal chromates and dichromates, such as magnesium, calcium strontium and barium chromates and dichromates and the like, ammonium chromate and dichromate, including mixtures of the foregoing. When acidifying the chromates and dichromates, any acid can be used although it is preferred a strong inorganic acid be used, particularly sulfuric acid or hydrochloric acid and preferably on about a mole per mole basis. Chromic acid is preferred for use in the processes of the present invention.

Although the concentration of the chromic acid can vary, due to, inter alia, composition of the sludge, method for treating the sludge and the like, in general, any concentration can be used which reduces the phosphorus content of the sludge without oxidizing substantial amounts of phosphorus to higher oxidation states. Such concentrations are usually relatively dilute, i.e., below about 20% by weight of the water present, and are preferably concentrations of from about 0.1% to about 10% by weight of the water present.

In general, any strong non-oxidizing acid which can increase the rate of coalescence of the phosphorus from the sludge can be used as the acidulating agent and, in particular, any acid, either organic or inorganic, which has a $pK_a$ less than about 3. The $pK_a$ of an acid is the negative log to the base 10 of the $K_a$ of the acid, i.e., $pK_a = -\log K_a$. The $K_a$ (ionization constant) of an acid as used herein refers to the dissociation of an acidic electrolyte at room temperature, i.e., about 25° C., and is equal to the product of the activities of each of the ions produced by the dissociation (if more than one ion of a given kind is produced, its activity is raised to the corresponding power) divided by the activity of the undissociated molecules with the activities assumed to be in their standard states at infinite dilution.

Such organic acids include carboxylic acids (both mono- and di-) such as bromoacetic, chloroacetic, α-chlorobutyric, chlorophenoxyacetic, α-chloro-propionic, citric, cyanoacetic, α-cyanobutyric, cyanoproponic, cyclopropane-1:1-dicarboxylic, dichloroacetic, dichloroaceylacetic, dihydroxymalic, dihydroxy, tartaric, iodoacetic, maleic, malonic, methyl malonic, oxalic, o-phthalic, α-tartaric, trichloroacetic and the like, sulfonic acids such as o-aminobenzene sulfonic, benzosulfonic, naphthalenesulfonic and the like, and benzoic acids such as o-bromobenzoic, o-chlorobenzoic, dihydroxybenzoic, fluorobenzoic, o-hydroxybenzoic, o-iodobenzoic, o-nitrobenzoic and the like.

Such inorganic acids include arsenic, phosphoric, pyrophosphoric, phosphorous, polyphosphorus, sulfuric, hydrochloric, and the like including mixtures thereof. Due to the relative inexpensiveness and ready availability, the inorganic acids are preferred for use as the acidulating agents in the process of the present invention and especially sulfuric acid and hydrochloric acid.

Although the concentration of acidulating agent necessary to increase the rate of coalescence of the phosphorus from the sludge impurities can vary widely, due to, inter alia, composition of the sludge, particular acidulating agent used and the like, it is usually sufficient to provide a concentration of at least about 0.1% by weight of the water in the sludge. There is, in general, no upper limit on the concentration of the acidulating agent, although high concentrations, that is, above about 50% by weight of the water present in the sludge, do not appear to significantly increase the rate of coalescence over lesser concentrations. Additionally, it is preferred that the concentration of the acidulating agent be from about 1.0% to 30% by weight of the water present in the sludge. The concentrations hereinbefore set forth with respect to the acidulating agent are intended to be those which are necessary to improve the rate of coalescence and are not intended to include amounts which may be used, for example, in acidifying water soluble hexapositive chromium containing compounds in order to form chromic acid in situ during the treating of the sludge.

The acidulating agent can be added to the sludge in relatively high concentrations, such as 80–100% by weight of water, and then the sludge diluted with water, if necessary, or the acidulating agent may be first diluted with water and then added to the sludge in concentrations which achieve effective results in separating the phosphorus from the treated sludge.

The acidulating agent can be added to the sludge either before, simultaneously with, or after the chromic acid has been added to the sludge, although it is preferred that the acidulating agent be added to the sludge after it has been treated with the chromic acid. In any event, the acidulating agent should be present during the coalescing of the phosphorus from the sludge.

The process of the present invention can be used in the processing of, in general, any phosphorus in water type sludge. As previously mentioned, the sludge is, in general, a poorly defined emulsion or dispersion containing solid impurities, water and phosphorus and the content of the sludge can vary considerably in the amount of each material which is present. Therefore, no general sludge analysis can be given which covers all sludge compositions, although, usually a typical sludge (phosphorus in water type emulsion) contains from about 1% to about 25% solids by weight, about 15% to about 85% phosphorus by weight and the balance being water which is present at least above 5% by weight. The pH of the sludge can vary but is usually below about 7.5 and more commonly from about 5 to 7.5. It is preferred that the sludge contain at least about 15% by weight of water in the treatment by chromic acid and/or the acidulating agent. It is rarely, if ever, necessary to have the sludge contain over 90% by weight of water.

As previously mentioned, the sludge can be treated with the chromic acid either during the formation thereof or after the sludge has been formed. It is preferred, however, to treat the sludge with the chromic acid after the sludge has been formed. In general, the sludge is formed when the phosphorus component of the phosphorus-containing gases is condensed to the liquid form.

The phosphorus-containing gases can vary in composition, however, usually such gases contain, in addition to phosphorus gas, a major amount, i.e., over about 50% by volume, of carbon monoxide and a minor amount of such materials as particulate impurities, methane, hydrogen, silicon tetrafluoride and the like. It is not uncommon for the phosphorus-containing gases to contain from about 1% to 15% by volume of phosphorus and as much as 75% to 90% by volume of carbon monoxide.

Treating the sludge during its formation can be accomplished, for example, by condensing the phosphorus with an aqueous medium containing the chromic acid, the temperature of which is below the dew point of the phosphorus. The pH of the aqueous medium used in condensing the phosphorus can vary but usually has a pH below about 7.5 and preferably from about 1 to 5.5 and can contain, in addition to the chromic acid, ammonia, alkali metal and ammonium hydroxides and carbonates, and other inorganic salts, particularly buffering salts. The temperature of the aqueous medium containing the chromic acid should be below the condensation temperature of the phosphorus vapor, and, although such varies with the composition of the phosphorus-containing gases, is preferably from about 40° C. to about 75° C. Although, in general, the phosphorus-containing gases need only be contacted with the aqueous condensing medium containing the chromic acid it is preferred that such be carried out under conditions which establish intimate contact of the gases with the aqueous medium such as by spraying the gases with a spray of the aqueous medium and the like. It should also be noted, that in some instances it may be advantageous to separately add the chromic acid during or after the contacting of the phosphorus-containing gases with the aqueous condensing medium. After treatment with the chromic acid the recovery of the phosphorus can be carried out by collecting the liquid phosphorus containing materials (condensate), which include phosphorus, sludge and the aqueous condensing medium (usually containing some chromic acid), separating the sludge from the phosphorus and the condensing medium, adding the acidulating agent to the sludge, allowing the phosphorus to settle out, and collecting the phosphorus.

Another method for treating the sludge is by contacting the sludge with chromic acid and acidulating agent after it has been formed. The sludge need only be contacted with the chromic acid, however, it is preferred that such be carried out under conditions which establish intimate contact of the discontinuous phase of the sludge and the chromic acid such as by stirring, vigorous agitation and the like. In cases where the sludge contains appreciable amounts of water, the chromic acid can be directly added thereto, however, it is preferred to first dissolve the chromic acid in an aqueous solution and contact the sludge therewith. In any event, it is usually desirable to contact the sludge with the chromic acid in the presence of an aqueous medium. After treatment the recovery of the phosphorus can be carried out by adding the acidulating agent thereto and thereafter allowing the phosphorus to settle out of the sludge and collecting the phosphorus.

Figure 2:
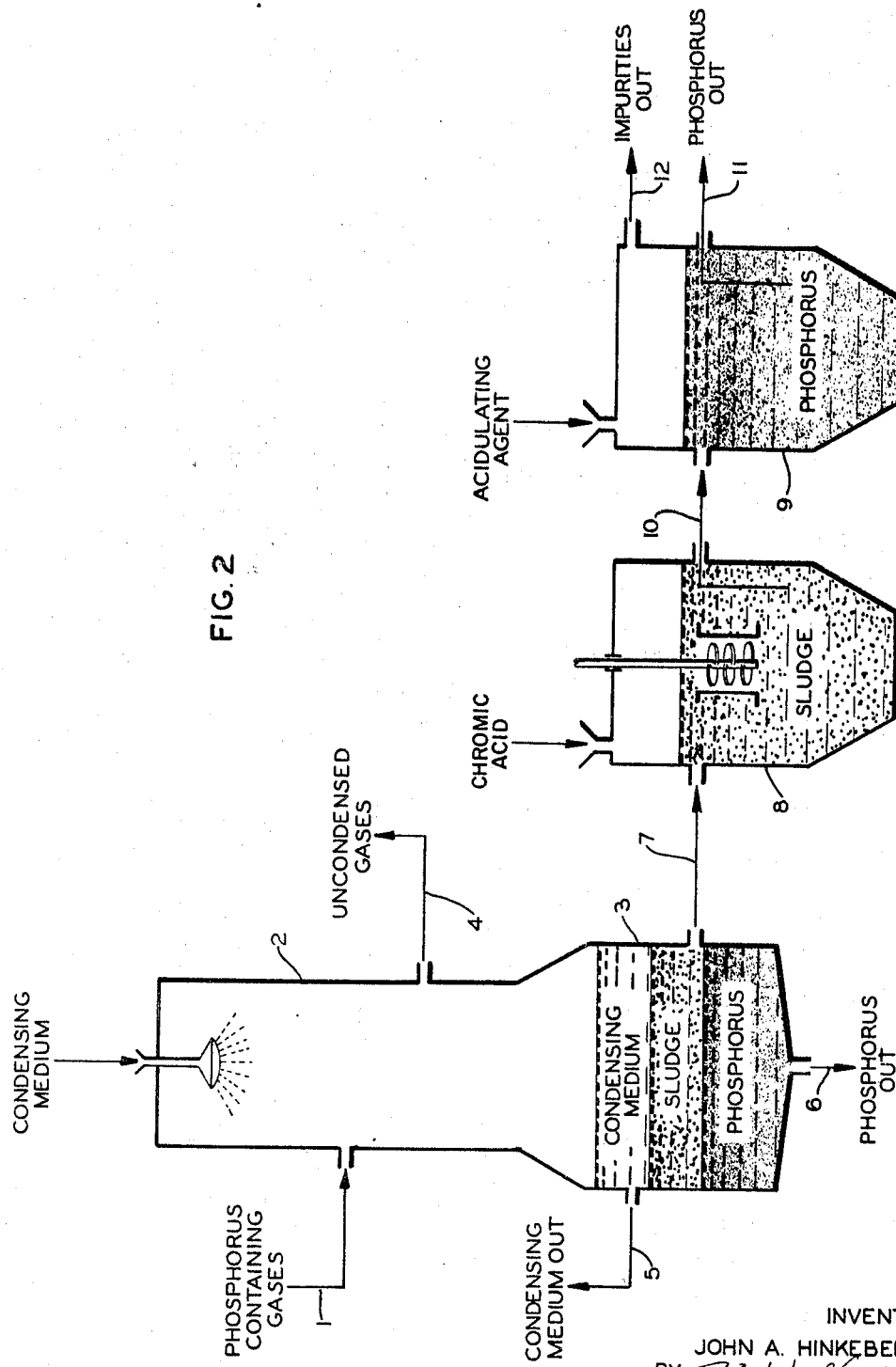

In order to facilitate the description and understanding of this invention, reference is made to the appended drawings in which:

FIGURE 1 is a schematic flow sheet showing one embodiment of the instant invention for the recovery of phosphorus from sludge; and FIGURE 2 is a schematic flow sheet showing another embodiment of the instant invention for the recovery of phosphorus from sludge.

Referring now to FIGURE 1 which illustrates one embodiment of the present invention. Phosphorus-containing gases produced, for example, in an electric furnace and, if desired, passed through process stages, such as electrostatic precipitators which remove from the gases to various degrees some of the particular impurities, are directed by line 1 to the condenser 2 where the gases are contacted with a condensing medium, usually water, and containing, if desired, such materials as dissolved ammonia, sodium hydroxide, sodium carbonate and the like. The phosphorus-containing gases are sprayed at a temperature below the dew point of phosphorus with the condensing medium. This results in the production of a liquid dispersion which includes phosphorus, condensing medium and sludge. The dispersion thus obtained is passed to a sump 3 and allowed to stratify into three rather distinct phases, i.e., phosphorus, sludge and condensing medium, although the boundaries between such phases are not necessarily distinct. The uncondensed gases are discharged by line 4 from the system and are usually conveyed to various points in the plant to be used as fuel. The condensing medium is passed by line 5 either for recycling back to the condenser or for disposal. The phosphorus is recovered from the sump by passing through line 6 to, for example, storage tanks maintained at a temperature high enough to keep the element in liquid form. The sludge phase (a phosphorus in water type emulsion or dispersion) is passed through line 7 to a sludge mixer tank 8. In this tank the sludge is mixed first with chromic acid and then with an acidulating agent in order to effect a separation of the phosphorus therefrom. As shown the mixer tank is operated continuously with the phosphorus separated from the sludge being removed therefrom by a gravity outlet 9 to, for example, a storage tank maintained at an elevated temperature sufficient to keep the phosphorus in the liquid form. The treated sludge is removed from the mixer tank by overflow and passed by line 10 for disposal.

Referring now to FIGURE 2 which illustrates another embodiment of the present invention. Phosphorus-containing gases produced, for example, in an electric furnace and, if desired, passed through electric precipitators which remove from the gases to various degrees some of the particulated impurities, are directed by line 1 to the condenser 2 where the gases are contacted with a condensing medium, usually water and containing, if desired, such materials as dissolved ammonia, sodium hydroxide, sodium carbonate and the like. The phosphorus-containing gases are sprayed at a temperature below the dew point of phosphorus with the condensing medium. This results in the production of a liquid dispersion which includes phosphorus, condensing medium and sludge. The dispersion thus obtained is passed to a sump 3 and allowed to stratify into three rather distinct phases, i.e., phosphorus, sludge and condensing medium, although the boundaries between such phases are not necessarily distinct. The uncondensed gases are discharged by line 4 from the system and are usually conveyed to various points in the plant to be used as fuel. The condensing medium is passed by line 5 either for recycling back to the condenser or for disposal. The phosphorus is recovered from the sump by passing through line 6 to, for example, storage tanks maintained at a temperature high enough to keep the element in the liquid form. The sludge phase (a phosphorus in water type emulsion or dispersion) is passed through line 7 to a mixer tank 8. In this tank the sludge is mixed with chromic acid and then passed to a settling tank 9 via line 10 where the acidulating agent is added to the treated sludge under slight mixing and then the phosphorus is allowed to settle from the sludge impurities. The phosphorus is removed therefrom by a gravity outlet 11 to a storage tank maintained at an elevated temperature sufficient to keep the phosphorus in liquid form. The sludge impurities are removed from the settler tank by overflow and passed by line 12 for disposal.

An alternate method to the foregoing, which in some cases may prove advantageous, is to pass the phosphorus containing sludge impurities to a settling tank, allowing a portion of the phosphorus to separate from the sludge impurities by settling out, removing the remaining phosphorus emulsion containing sludge impurities and treating this emulsion with chromic acid in a mixer tank and with the acidulating agent in a settler tank as hereinbefore described.

In order to illustrate the present invention, the following example is presented with parts and percentages being by weight unless otherwise specified.

EXAMPLE

A sludge phase (phosphorus in water type emulsion) obtained from a phosphorus sump, having a density of about 1.5 and the following composition:

| Composition: | Percent by weight |
|---|---|
| $P_4$ | 70 |
| Solids | 10 |
| Water | 20 | was charged to a mixer under stirring with a blade speed of about 3400 r.p.m. A 10% solution of chromic acid was charged to the mixer and mixed with the sludge at a concentration of about 1.6% for about 1 minute. Acid was then added in amounts as indicated to the treated sludge and mixed for about 1 minute at 3400 r.p.m. After mixing the material was stirred with a rake at 40 r.p.m. until it coalesced. The time in minutes required to separate the phosphorus from the sludge was noted. The following table reports the results:

TABLE

| | Acid | Acid amounts (percent conc.) | Time (minutes) require to coalesce the reported percent of the phosphorus | |
|---|---|---|---|---|
| | | | 25 | 50 |
| 1 | Sulfuric | 0 | 60 | 120 |
| 2 | do | 2.5 | 18 | 30 |
| 3 | do | 5.0 | 12 | 25 |
| 4 | do | 10.0 | 8 | 12 |
| 5 | do | 20.0 | 4 | 5 |
| 6 | Hydrochloric | 30.0 | 5 | 9 |

The above data dramatically illustrates the ability of the present invention to reduce the phosphorus content of the sludge as well as increasing the rate of coalescence or separation of phosphorus from the sludge using an acidulating agent of the present invention after the sludge has been treated with chromic acid (2–6) as compared to just treating the sludge with chromic acid (1).

The process of the present invention has many advantages over the conventional physical methods for recovering phosphorus from the sludge which includes an easy, economical and simple method which does not require elaborate processing equipment along with the necessary care and maintenance thereof as well as permitting in some instances process equipment to be eliminated such as, for example, the elimination of the electrostatic precipitators used in purifying the phosphorus-containing gases. Additionally, the process is quite versatile in that it can be adapted for use at various stages in the process. Still further, the process permits the recovery of a relatively high quality phosphorus.

What is claimed is:

1. A process for reducing phosphorus content of a phosphorus and water type sludge comprising treating the sludge with chromic acid and coalescing the phosphorus in said sludge in the presence of an acidulating agent selected from the group consisting of sulfuric acid and hydrochloric acid, said chromic acid being present in a concentration of from about 0.1% to 10% by weight of water present in the sludge and said acidulating agent being present in a concentration of from about 1.0% to 30% by weight of the water present in the sludge and thereafter separating phosphorus from said sludge.

2. The process of claim 1 wherein said sludge is admixed with said chromic acid and thereafter said acidulating agent is added thereto.

3. In the process for preparing elemental phosphorus wherein phosphatic materials are thermally reduced with a reducing agent in the presence of a flux to produce phosphorus containing gases and thereafter condensing the phosphorus in said gases by spraying therewith an aqueous condensing medium having a temperature below the dew point of phosphorus, collecting the liquid phosphorus containing materials therefrom, separating said materials into a sludge phase and a phosphorus phase and separating said phases, the improvement which comprises treating said sludge phase with chromic acid and coalescing the phosphorus in said sludge phase in the presence of an acidulating agent selected from the group consisting of hydrochloric acid and sulfuric acid, said chromic acid being present in a concentration of from about 0.1% to 10% by weight of water present in the sludge and said acidulating agent being present in a concentration of from about 1.0% to 30% by weight of the water present in the sludge and thereafter separating phosphorus from said sludge.

4. The process of claim 3 wherein said sludge is admixed with said chromic acid and thereafter said acidulating agent is added thereto.

References Cited

UNITED STATES PATENTS

| 2,050,796 | 8/1936 | Kerschbaum et al. | 23—223 |
| 3,104,952 | 9/1963 | Hartig | 23—223 XR |

FOREIGN PATENTS

| 279,710 | 11/1927 | Great Britain. |

OSCAR R. VERTIZ, *Primary Examiner.*

L. A. MARSH, *Assistant Examiner.*